United States Patent
Schmidt et al.

(10) Patent No.: US 6,295,814 B1
(45) Date of Patent: Oct. 2, 2001

(54) INTERNAL-COMBUSTION ENGINE WITH AN EXHAUST GAS TURBOCHARGER

(75) Inventors: Erwin Schmidt, Baltmannsweiler (DE); Marco Schade, Endigen (CH); Siegfried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/403,605

(22) PCT Filed: Apr. 9, 1998

(86) PCT No.: PCT/EP98/02104

§ 371 Date: Jan. 10, 2000

§ 102(e) Date: Jan. 10, 2000

(87) PCT Pub. No.: WO98/48156

PCT Pub. Date: Oct. 29, 1998

(30) Foreign Application Priority Data

Apr. 23, 1997 (DE) ................................. 197 17 094

(51) Int. Cl.$^7$ ....................................................... F02D 23/00
(52) U.S. Cl. ............................... 60/602; 60/600; 60/601; 60/603; 60/624; 123/564
(58) Field of Search ............................ 60/602, 600, 601, 60/603, 611, 624; 123/564

(56) References Cited

U.S. PATENT DOCUMENTS

| | | | |
|---|---|---|---|
| 4,466,248 | * 8/1984 | Nartowski | 60/602 |
| 4,597,264 | * 7/1986 | Cipolla | 60/602 |
| 5,605,044 | * 2/1997 | Zimmer et al. | 60/602 |
| 5,647,318 | * 7/1997 | Feucht et al. | 60/602 |
| 5,729,980 | * 3/1998 | Mackay | 60/602 |
| 5,755,101 | * 5/1998 | Free et al. | 60/602 |
| 5,813,231 | * 9/1998 | Faletti et al. | 60/602 |
| 5,884,482 | * 3/1999 | Lange et al. | 60/624 |

* cited by examiner

Primary Examiner—Thomas Denion
Assistant Examiner—Thai-Ba Trieu
(74) Attorney, Agent, or Firm—Crowell & Moring LLP

(57) ABSTRACT

An internal-combustion engine with a turbocharger is suggested, in the case of which a limiting of the exhaust gas counterpressure is provided in the braking operating mode of the internal-combustion engine.

21 Claims, 1 Drawing Sheet

INTERNAL-COMBUSTION ENGINE WITH AN EXHAUST GAS TURBOCHARGER

BACKGROUND AND SUMMARY OF THE INVENTION

The invention relates to an internal-combustion engine having an intake pipe, an exhaust pipe and an exhaust gas turbocharger whose compressor is situated in the intake pipe and whose turbine, acting in the engine braking operation as a throttle raising the exhaust gas counterpressure, is situated in the exhaust pipe which, in its section extending toward the turbine, is provided with a valve which can be acted upon by actuators, by way of which valve, as a function of operating parameters of the internal-combustion engine/exhaust gas turbocharger system, a bypass is to be opened which bypasses the turbine.

In the case of internal-combustion engines, which, as supercharged internal-combustion engines, are equipped with an exhaust gas turbocharger, it is generally customary to arrange a blow-off valve, normally also called "waste gate", in the exhaust pipe. In known solutions, this blow-off valve is used as a function of operating parameters for the charge pressure control, for example, the taken-in air quantity, the rotational speed, the charge pressure and/or the throttle valve position of the internal-combustion engine being used as parameters.

From the German Document DE-Z, Linnhoff/Peters/Schindler, "Computer Simulation of the Injector Flow at the Turbine Bypass of a Supercharged Diesel Engine", *MTZ Motortechnische Zeitschrift* 1987/10, Pages 395–402, it is known that, as the result of the opening-up of the "waste gate", the pressure from the turbine can be lowered in order to thus lower the exhaust work and therefore the full-load consumption of the engine.

The goal of such charge pressure control known in the practice is, for example, the improving of the response behavior of internal-combustion engines supercharged by way of exhaust gas turbochargers for avoiding the so-called turbohole, or for limiting the power of the engine in the upward direction.

Since the turbine of the exhaust gas turbocharger is situated in the exhaust pipe, it virtually forms a throttle and acts as a ram element in the exhaust gas flow. By way of this arrangement, the buildup of an exhaust gas counterpressure is caused and/or promoted in a desirable manner in the engine braking operation, in which case the maximally permissible exhaust gas counterpressure determines the maximal engine braking performance and is defined by the respective loading capacity of the engine.

German Patent Document DE 42 32 400 C1 suggests the use of the retaining effect of the turbine of the exhaust gas turbocharger in the engine braking operation, in which case, by means of an adjustable flow guiding device of the turbine, the throttle cross-section of the turbine can be varied. As the result, the braking performance is to be adjustable, and a separate engine braking device is to be eliminated.

It is an object of the invention to limit this exhaust gas counterpressure to an extent which is still acceptable for the braking operation, in order to avoid damages to the engine.

Within the scope of the invention, this is achieved by providing the use of a valve which limits the exhaust gas counterpressure in the engine braking operation and opens up an access to a bypass surrounding the turbine.

As a further development of the invention, the valve is spring-loaded in the closing direction and is expediently acted upon by actuators which comprise an actuating piston which, in the engine braking operation, can be acted upon by exhaust gas counterpressure in the opposite direction of the spring.

In this case, it is also expedient, for assisting the spring, to act upon the actuators by charge pressure, with the same effect as that of the spring, so that also relatively high exhaust gas counterpressures can be controlled at a spring force which is not excessive and, as the result of the differential pressure relationship between the charge pressure and the exhaust gas counterpressure, changes in the control action, which in this respect occur as a function of the rotational speed, can be utilized.

It was found to be particularly expedient to use the same valve as the blow-off valve for the engine braking operation, on the one hand, and for the combustion operation, thus the working operation of the engine, on the other hand; in the former case, for limiting the exhaust gas counterpressure and, in the latter case, for limiting the charge pressure, for which it was found to be expedient to use the charge pressure for the combustion operation as control pressure counteracting the spring force. In view of the adaptation to the defined spring force, on the one hand, and the available charge pressure, on the other hand. It may be expedient in this case to modulate the charge pressure—in coordination with the actuating force of the spring—, particularly by means of a differential pressure cylinder.

The throttling effect of the turbine in the engine braking operation can be influenced within the scope of the invention by the use of exhaust gas turbochargers in the case of which the turbine-side flow-through cross-section is variable and can be at least largely blocked.

This is conceivable in the case of turbines, in which the flow duct surrounding the turbine wheel has a ring-nozzle-shaped mouth area leading to the flow inlet cross-section of the turbine wheel and, in this mouth area, has at least one set of variable guide baffles with guide blades, by way of which the flow cross-section of the ring-nozzle-shaped mouth area can be adjusted. The use of the invention in conjunction with such exhaust gas turbochargers, whose flow cross-section is variable and can at least largely be blocked, may be expedient for reasons of safety or for improving the overall control action; specifically because, in the case of internal-combustion engines with such exhaust gas turbochargers, the buildup of the exhaust gas counterpressure, as a function of the rotational speed, can, even below the nominal rotational speed of the internal-combustion engine, reach a magnitude which would result in the destruction of the internal-combustion engine.

In particular, the use of the invention was also found to be expedient in the case of exhaust gas turbochargers, in the case of which the flow-through cross-section in the mouth area to the turbine can be varied by the axial displacement of a flow guiding device and can at least largely be blocked off, in which case, along its axial course, the flow guiding apparatus may have, in addition to guiding elements, such as blades, ducts or the like, in an axially offset manner thereto, also more or less closed circumferential sections which, by a covering to the mouth area, at least largely block off the flow-through cross-section. Specifically in connection with such further developments of exhaust gas turbochargers, the use of the invention may be expedient because even slight changes of the clear flow-through cross-section have large effects on the respective exhaust gas counterpressure and, since a corresponding precision adjustment of the guiding device is difficult to control, causes high expenditures, particularly under the extreme conditions existing in an exhaust gas turbine. The invention can naturally also be used in the case of modified solutions with an axially displaceable guiding device, for example, in solutions, in which an additional, coaxially situated shut-off sleeve is used as a shut-off element.

Other objects, advantages and novel features of the present invention will become apparent from the following detailed description of the invention when considered in conjunction with the accompanying drawings.

DETAILED DESCRIPTION OF THE DRAWINGS

Figure 1:
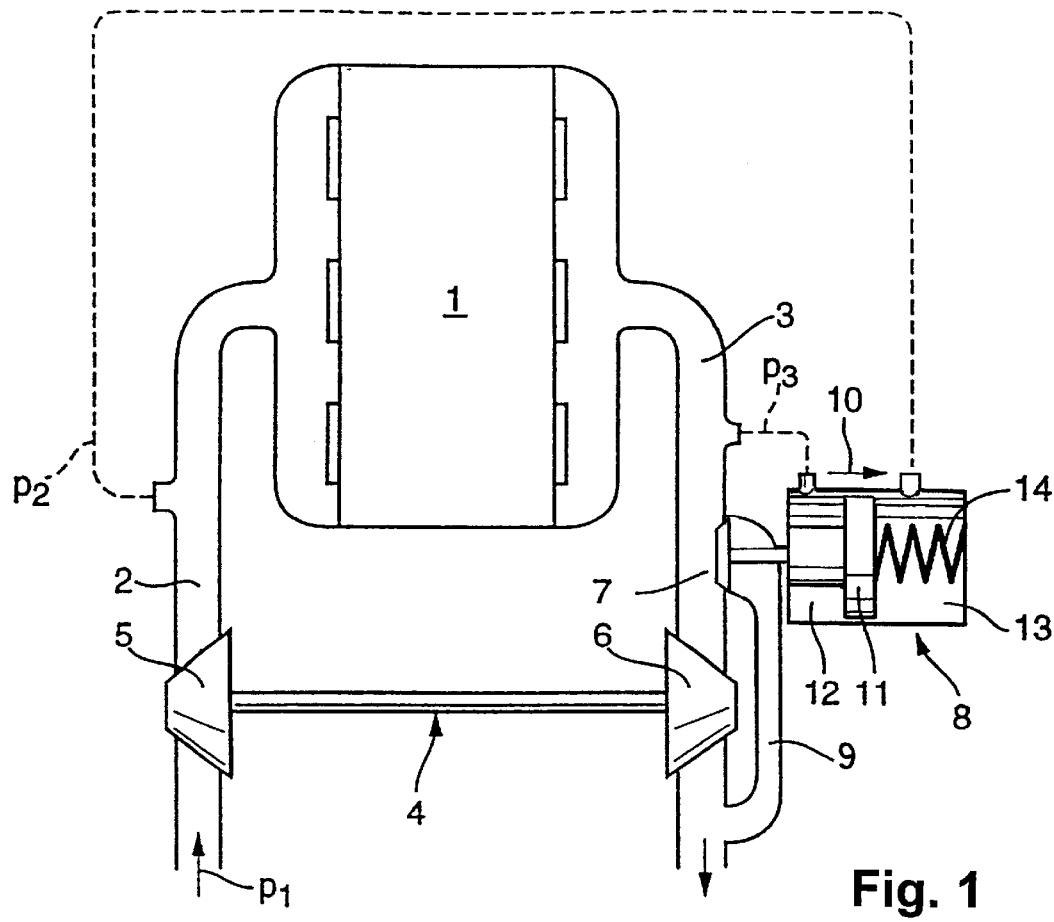
FIG. 1 is a schematic and global view of an internal-combustion engine with the assigned turbocharger.

In the figures, reference number 1 indicates an internal-combustion engine which comprises an intake pipe 2, an exhaust pipe 3 and, in a very schematic view, an exhaust gas turbocharger 4, whose compressor 5 is situated in the intake pipe 2 and whose turbine 6 is situated in the exhaust pipe 3.

The turbocharger 4, which is shown here in a very simplified manner, may have, for example, a turbine wheel which acts as the turbine 6 and which is surrounded by a flow duct whose transition cross-section to the turbine wheel can be varied by means of a guiding apparatus with corresponding adjusting and/or shut-off elements to such an extent that a flowing-off of exhaust gas in the exhaust pipe 3 beyond the turbine 6 is largely prevented. As the result, for the braking operation of the internal-combustion engine 1, an exhaust gas backpressure can be achieved, in which case, above the rotational speed of the internal-combustion engine, the exhaust gas counterpressure marked $p_3$, retained in the exhaust gas pipe 3 rises and may reach values critical for the internal-combustion engine.

In order to avoid this but, on the other hand, dam up the exhaust gas in the lower rotational speed range in the described manner to a greater extent and to increase the braking performance obtained from the charge cycle loop, a valve 7 is arranged in the exhaust pipe 3, to which actuators 8 are assigned and by way of which a bypass 9 can be controlled which bridges the exhaust pipe 3 in the area of the turbine 6.

The opening direction of the valve has the reference number 10, and an actuating cylinder is provided as the actuator 8 for the valve 7, which actuating cylinder comprises a piston 11 by which two cylinder chambers 12 and 13 are separated from one another. Cylinder chamber 12 faces the valve 7; in the opposite cylinder chamber 13 facing away from the valve, a spring 14 is provided which loads the valve in the closing direction. The chambers 12 and 13 are also provided with pressure connections, FIG. 1 shows the pressure admission provided for the braking operation of the internal-combustion engine 1; specifically, on the part of the chamber 12, the connection to the exhaust pipe 3, and thus the admission of exhaust gas counterpressure $p_3$, and, on the part of the chamber 13, the connection to the intake pipe 2, and thus in a superimposed manner, for loading the spring 14, the admission of charge pressure $P_2$.

In this manner, as the exhaust gas counterpressure $p_3$ rises, the valve 7 is acted upon in the opening direction 10 with a rising rotational speed, in which case, as the result of the coordination of the active surfaces, including the surface of the valve disk of the valve 7, and a corresponding determination of the force of the spring 14, a pressure can be defined at which the valve 7 opens and opens up the bypass 9. In order to be able to implement braking performances which are as high as possible, the defining expediently takes place to a pressure $p_3$, which corresponds to the exhaust gas counterpressure which is still permissible for the braking operation of the internal-combustion engine 1.

Figure 2:
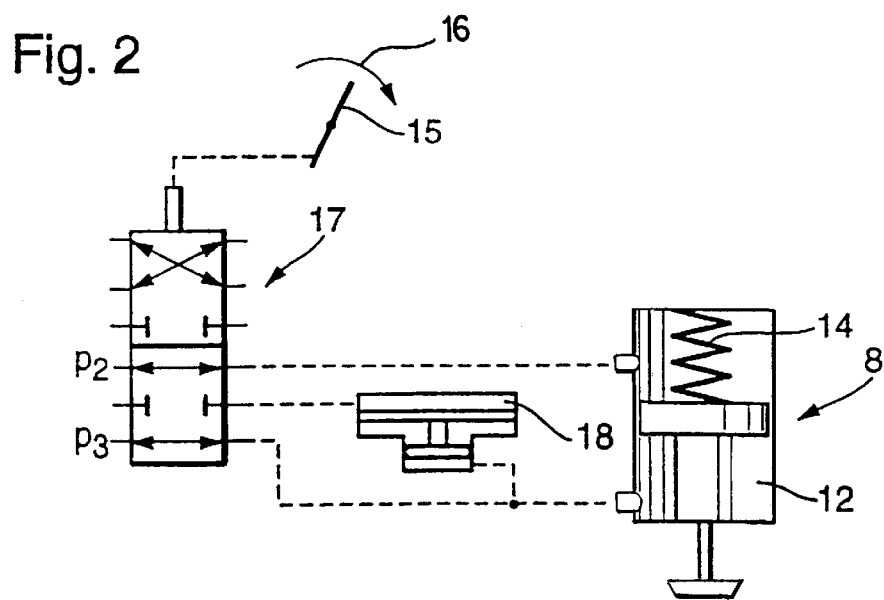
FIG. 2 is an enlarged view according to FIG. 1 of a blow-off valve arranged in front in the exhaust gas pipe of the turbine, with a corresponding actuating device and a control circuit.

The normally required charge pressure limitation implemented by way of a blow-off valve provided in the exhaust gas pipe system may—within the scope of the solution according to the invention for limiting the braking performance by way of the valve 7—when the controlling of the actuator 8 is correspondingly changed, also be implemented by way of the valve 7. FIG. 2 shows a respective switching arrangement, in which case FIG. 2 is only understood to be a schematic embodiment. In this case, in the illustrated switching position, the connections to the intake pipe 2 and the exhaust pipe 3 with the corresponding pressures $P_2$ and $p_3$ as in FIG. 1 are assigned to the actuator 8, for which the same reference number is used as in FIG. 1. A switching-over from this illustrated representation into a switching position corresponding to the combustion operation of the internal-combustion engine 1 and limiting the charge pressure can be achieved by way of the illustrated 6/2-way valve, in which case the switching-over can be carried out by way of the symbolically illustrated power control element of the internal-combustion engine, in this case, the accelerator pedal 15, or as a function of the operation of the brake pedal, or as a function of the rotational speed. When the pedal 15 is acted upon in the direction of an increasing power—arrow 16—, the change-over of the 6/2-way valve having the reference number 17 is triggered. In the switched-over second switching position, the charge pressure $p_2$ which is branched off the intake pipe 2, is switched to the chamber 12, while the exhaust gas counterpressure $p_3$ branched off the exhaust pipe 3 is faded out.

Within the scope of the invention, it may be expedient to carry out, for an adaptation to the spring force 14 and taking into account the relatively large pressure difference existing between the pressures $p_2$ and $p_3$, a coordination between the pressure $p_2$ and the force of the spring 14 by way of a differential pressure valve 18 which is connected into the control path between the way valve 17 and the connection to the cylinder chamber 12 in the second switching position of the way valve 17, as illustrated in FIG. 2.

The solution according to the invention therefore illustrates a very simple method of limiting, at very low additional expenditures, the exhaust gas counterpressure $p_3$ as well as the charge pressure $p_2$.

Within the scope of the invention, it is also conceivable, but not shown here in detail, to adjust the blow-off valve 7 in a characteristic-diagram-controlled manner, with a view to the charge pressure as well as with a view to the exhaust gas counterpressure with respect to its valve stroke. In this case, by way of the characteristic diagram in the engine control unit, a corresponding charge pressure $p_2$ as well as a corresponding exhaust gas counterpressure $p_3$ can be defined for each rotational engine speed, specifically while taking into account the respective operation of the internal-combustion engine; that is, its operation in the combustion operating mode or in the braking operating mode. The exhaust gas counterpressure $p_3$, and the charge pressure $p_2$, which exists in the exhaust pipe 3 or in the intake pipe 2, is compared with the defined desired value, and, by way of an assigned servo motor, the valve is adjusted corresponding to this actual-desired value comparison.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal-combustion engine having an intake pipe, an exhaust pipe and an exhaust gas turbocharger, whose compressor is situated in the intake pipe and whose turbine, acting in the engine braking operation as a throttle raising the exhaust gas counterpressure, is situated in the exhaust pipe which, in a section of the exhaust pipe extending toward the turbine, is provided with a valve which can be acted upon by actuators, by way of which valve, as a function of operating parameters of the internal-combustion engine/exhaust gas turbocharger system, a bypass is to be opened which bypasses the turbine, wherein the valve is to be opened in the braking operation of the internal-combustion engine for limiting the exhaust gas counterpressure.

2. The internal-combustion engine according to claim 1, wherein the valve is spring-loaded in the closing direction.

3. The internal-combustion engine according to claim 2, wherein actuators are assigned to the valve and comprise an actuating piston which, in the braking operation, is acted upon in the opposite direction of the spring by exhaust gas counterpressure.

4. The internal-combustion engine according to claim 3, wherein the actuating piston, in the braking operation, can be acted upon by charge pressure in the same direction as that of the force of the spring.

5. The internal-combustion engine according to claim 4, wherein, in the combustion operation of the internal-combustion engine, the valve is additionally used as a blow-off valve for limiting the charge pressure.

6. The internal-combustion engine according to claim 5, wherein, in the combustion operation of the internal-combustion engine, the valve can be acted upon against the spring force by charge pressure in the opening direction.

7. The internal-combustion engine according to claim 6, wherein the charge pressure, for acting upon the actuating piston in the opening direction of the valve can be modulated in coordination with the actuating force of the spring.

8. The internal-combustion engine according to claim 7, wherein a pressure modulator is provided in the feed pipe to the chamber acted upon on the charge-air side in the combustion operation.

9. The internal-combustion engine according to claim 3, wherein the exhaust gas turbocharger is provided with a turbine-side flow-through cross-section which can be at least largely shut off.

10. The internal-combustion engine according to claim 4, wherein the exhaust gas turbocharger is provided with a turbine-side flow-through cross-section which can be at least largely shut off.

11. The internal-combustion engine according to claim 2, wherein, in the combustion operation of the internal-combustion engine, the valve is additionally used as a blow-off valve for limiting the charge pressure.

12. The internal-combustion engine according to claim 11, wherein, in the combustion operation of the internal-combustion engine, the valve can be acted upon against the spring force by charge pressure in the opening direction.

13. The internal-combustion engine according to claim 12, wherein the charge pressure, for acting upon the actuating piston in the opening direction of the valve can be modulated in coordination with the actuating force of the spring.

14. The internal-combustion engine according to claim 13, wherein a pressure modulator is provided in the feed pipe to the chamber acted upon on the charge-air side in the combustion operation.

15. The internal-combustion engine according to claim 14, wherein the exhaust gas turbocharger is provided with a turbine-side flow-through cross-section which can be at least largely shut off.

16. The internal-combustion engine according to claim 11, wherein the exhaust gas turbocharger is provided with a turbine-side flow-through cross-section which can be at least largely shut off.

17. The internal-combustion engine according to claim 2, wherein the exhaust gas turbocharger is provided with a turbine-side flow-through cross-section which can be at least largely shut off.

18. The internal-combustion engine according to claim 1, wherein the exhaust gas turbocharger is provided with a turbine-side flow-through cross-section which can be at least largely shut off.

19. An internal-combustion engine comprising:

an intake pipe, an exhaust pipe, an exhaust gas turbocharger including a compressor in the intake pipe and a turbine in the exhaust pipe, a bypass line connected to the exhaust pipe upstream of the turbine and extending in bypassing relation to the turbine, a bypass control valve operable to control flow of gas from the exhaust pipe through the bypass line, and a valve control assembly operable to open the bypass control valve during braking operation of the engine to thereby limit exhaust gas counterpressure upstream of the turbine.

20. The internal-combustion engine according to claim 19, wherein said valve control assembly includes a spring biasing the bypass control valve toward a bypass line closing position.

21. The internal-combustion engine according to claim 20, wherein the valve control assembly includes:

an actuating piston movable in a cylinder with the control valve, said spring acting directly on one side of the piston biasing the valve toward a bypass line closing position, and a line communicating an opposite side of said piston with the exhaust pipe at a location upstream of the turbine.

* * * * *